Figure 1:
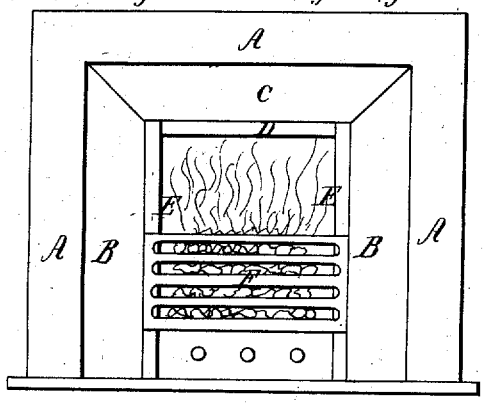

No Printed Specification Available

9765X NO PRINTED COPY OF SPECIFICATION IN OFFICE.

W. Anderson.

Fire Place.

Patented Jun. 25, 1836.

Front view of the cast iron front, jambs & breast

The separate reflector jambs. & top inclined plate

9765X

June 25, 1836

William Anderson of New York City

Letters-Patent,

The Schedule referred to in these Letters Patent and making part of the same containing a description in the words of the said William Anderson himself of his improvement in the mode of constructing Parlour and other grates.

To all whom it may concern. Be it known that I William Anderson of the City of New York in the State of New York have invented an improved mode of constructing Parlour and other grates in which anthracite or other fuel is burnt in which improved grate stove or fire place the heat from the fuel is economised by the employment of Reflectors which form or cover the jambs and the inclined front of the opening of the Stove or fire place above the throat thereof and I do hereby declare that the following is a full and exact description thereof reference being had to the drawing which accompanies and makes a part of this Specification.

This Grate with its reflectors may be placed within an open Stove constructed in the manner of that usually called the Franklin Stove having a pipe or opening on the back or top thereof leading into a chimney or flue thus allowing the same to stand out from a fire board or Wall or it may be placed within a cast iron or other fire place built or standing within an ordinary fire place.

Fig. 1. in the accompanying drawing represents a cast iron front jambs & breast of a fire place. The flat plates A are intended to fit up against the ordinary front of a fire place so that the jambs B.B. and the inclined breast or upper plate C in front of the throat D shall stand within, allowing the back E to touch or approach towards the back of the ordinary fire place. The grate I generally construct so that it may be raised or lowered as may be found convenient, which may be effected by means of Hooks or other contrivances. The jambs B.B. I prefer to cast or make concave as being best adapted to the reflectors by which they are to be covered as the concave form of the reflectors will, it is believed distribute the radiant heat most advantageously into the apartment. They may however be made flat or even concave to a certain extent and yet produce much of the benefit to be derived from the reflection of the radiant heat. The upper inclined plate C. extends or inclines back from the front plate A to the throat or opening of the draught D. This Plate I generally make flat and cover it with a reflecting plate of the same form: but 9765X June 25, 1836

Figure 2:
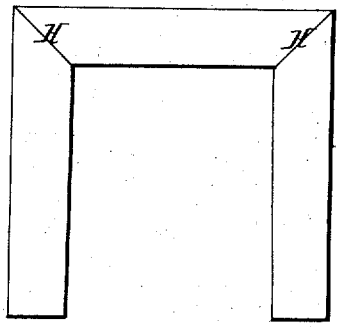

34 tis also if preferred may be made convex or concave. Fig 2. Represents the reflecting
jambs and top inclined plate which are intended to cover the cast iron or other
jambs and top plate in fig 1. I have in the drawing represented the jambs &
top plate as in one piece but I usually make them in three pieces being separated
at the mitres. H.H. They have thin edges prepared to receive them, and hold them
in their places at the bottom of the jambs B.B. fig 1. and at their junction with
the top Plate C. When the Franklin Stove form is prepared, the whole ar-
rangement remains the same with that already described excepting that the ^ne^ [illegible]
D. is connected with and leads to the pipe which is to carry off the gaseous pro-
ducts of combustion. Such a fire place or Stove may be very advantageously
used for the purpose of cooking by those who wish to employ it in that way. A ver-
tical box or case furnished with reflectors on the inside may be made to stand up
on the hearth, its edges fitting against the plates A.A. Shelves hooks pans &c may
be placed within this and a portable jack may be used. Such a contrivance may
be placed upon wheels so as to be readily moved or ^to be^ made to recede from or approach
towards the fire. The reflectors forming or covering the jambs, and inclined top
plates may be made of any kind of metal which can readily be polished and kept
bright; I have found sheet zinc to answer the purpose perfectly well and it
is sufficiently firm and unyielding to admit of its being removed for cleaning with-
out being liable to injury which is a point of considerable importance instead of
reflectors of polished metal, I intend sometimes to use surfaces covered with enamel
which may be easily cleaned and is also a good reflector of heat.

What I claim as my invention and wish to secure by Letters Patent is the
construction of the jambs and top plate of Stoves grates or fire places by forming or
covering them with polished reflectors substantially in the manner described
whether the same be applied upon foundations of cast iron as herein set forth or
upon any other material, or in any other manner in which similar results are
obtained by analagous means

Wm Anderson

Exd. Witnesses
W.C. [illegible] Cooper Anderson
B K Morsell

Drawing [illegible]